United States Patent [19]

Ezekiel

[11] 4,293,137
[45] Oct. 6, 1981

[54] MAGNETIC LIQUID SHAFT SEALING

[76] Inventor: Frederick D. Ezekiel, 75 Allen St., Lexington, Mass. 02173

[21] Appl. No.: 968,370

[22] Filed: Dec. 11, 1978

[51] Int. Cl.³ .......................... F16J 15/16; F16J 15/40
[52] U.S. Cl. .................................. 277/80; 308/187.1; 308/187.2; 335/303
[58] Field of Search ............... 277/80, 135; 308/187.1, 308/187.2; 335/303

[56] References Cited

U.S. PATENT DOCUMENTS

| | | |
|---|---|---|
| 2,557,140 | 6/1951 | Razdowitz . |
| 2,974,981 | 3/1961 | Vervest et al. . |
| 3,612,549 | 10/1971 | Berkowitz . |
| 3,620,584 | 11/1971 | Rosensweig ..................... 308/187.1 |
| 3,740,060 | 6/1973 | Miskolczy ............................ 277/80 |
| 3,848,879 | 11/1974 | Hudgins . |
| 3,897,288 | 7/1975 | Fayling ................................ 335/303 |
| 4,171,818 | 10/1979 | Moskowitz et al. .................. 277/80 |

FOREIGN PATENT DOCUMENTS

| | | | |
|---|---|---|---|
| 2736642 | 2/1979 | Fed. Rep. of Germany ...... | 335/303 |
| 783881 | 10/1957 | United Kingdom . | |
| 841894 | 7/1960 | United Kingdom ................ | 335/303 |

OTHER PUBLICATIONS

Improvements Relating to Shaft and Like Seals DE–AL 2628 831 (Machinenfabrik Ausburg-Nurnberg AG).
H. Reinboth "Tehnologie und Anwendung Magnetischer Werkstoffe" 1970, Veb Verlag Technik, Berlin, p. 351.

Primary Examiner—Robert I. Smith
Attorney, Agent, or Firm—Charles Hieken

[57] ABSTRACT

A magnetic liquid seal comprises a single axially magnetized permanent magnet in the shape of a flat washer having magnetic liquid captured on the inside or outside diameters, or both. Leakproof sealing is achieved between either the outside diameter and an external housing or between the inner diameter and an external shaft.

10 Claims, 7 Drawing Figures

MAGNETIC LIQUID SHAFT SEALING

BACKGROUND OF THE INVENTION

The present invention relates in general to sealing and more particularly concerns novel apparatus and techniques for economically effecting a good shaft seal with relatively little apparatus that is compact, lightweight and easily installed.

Shaft seals incorporating permanent magnets, pole pieces and magnetic liquids capture the magnetic liquid between the pole pieces and other parts having relative motion to achieve complete sealing. The prior art includes British Patent Specification No. 783,881; U.S. Pat. Nos. 3,620,584; 3,612,549 and 3,848,879.

These prior art teachings have successfully been used to seal against vacuum and sometimes pressures of several hundred pounds per square inch. Intricate multistage seals are commercially available.

It is an important object of the invention to provide an improved shaft seal using magnetic liquid.

It is another object of the invention to achieve the preceding object with relatively little structure that is relatively easy and inexpensive to install.

It is a further object of the invention to achieve one or more of the preceding objects with apparatus that will retain the seal for relatively long periods of time.

SUMMARY OF THE INVENTION

A seal according to the invention may comprise a single axially magnetized permanent magnet in the form of a washer or a disc with a ring of magnetic fluid about the axis thereof magnetically adhered thereto and coating therewith to complete a shaft seal. Broadly speaking, the seal comprises thin permanent magnet means characterized by a cross section having a thickness dimension between opposed end faces of the permanent magnet means that is smaller than a height dimension and magnetized along an axis parallel to the thickness dimension for establishing a magnetic field along at least one exposed surface thereof between the end faces which magnetic field is generally parallel to said axis. A closed loop of magnetic fluid along that at least one exposed surface is maintained thereat by the magnetic fluid thereat. It has been observed that when a small amount of magnetic liquid is brought near the outer edge of an axially magnetized disc made of a permanent magnet material, the magnetic liquid distributes itself evenly all around the edge in a circumfrential manner. The actual contour of the liquid is determined by the magnetic flux lines connecting the opposite poles located on either side of the disc. In a similar manner, should a hole be bored in the disc, magnetic liquid will distribute itself on the inner surface. Alternatively, a flat permanent magnet in the form of a washer will capture magnetic liquid on both its outer and its inner surfaces. Thus, sealing can be achieved between either the outer surface and an external housing, between the inner surface and a shaft protruding through the hole in the washer, or both surfaces at the same time. The degree of sealing is a function of several parameters, such as the gap between the magnet and the adjoining surface, the magnetic strength of the liquid, the nature and strength of the permanent magnet, and other factors.

Advantages of the invention include its extreme simplicity and low cost. One disc which can be made out of inexpensive magnetic material is the seal itself. This disc can be made quite thin, perhaps as low as 0.003 inches, which can be used in narrow spaces where other seals cannot fit.

Furthermore, this type of seal can be used in conjunction with magnetic or nonmagnetic shafts and housings. This is another advantage over state of the art magnetic liquid seals.

Because of its inherent simplicity such a seal has a relatively low differential pressure holding capability and is useful as an exclusion seal.

Numerous other features, objects and advantages of the invention will become apparent from the following specification when read in connection with the accompanying drawing in which:

DETAILED DESCRIPTION OF PREFERRED EMBODIMENTS

Figure 1:
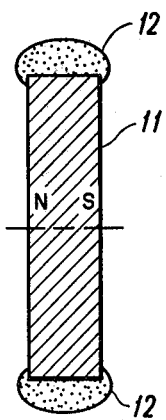
FIG. 1 shows sectional view of a permanent magnet disc with magnetic liquid trapped on its outer edge according to the invention.

With reference now to the drawing and more particularly FIG. 1 thereof, there is shown a sectional view of a round disc 11 made of a permanent magnet material. Disc 11 is magnetized along its axial direction as shown. Magnetic liquid 12 is shown clinging to the outer circumferential edge of disc 11.

The disc 11 is thin permanent magnetic means characterized by a cross section having a thickness dimension T between opposed end faces 11N and 11S of the magnet means that is smaller than a height dimension H and magnetized along an axis 11A parallel to the thickness dimension T that establishes a magnetic field along at least one exposed surface 11B thereof between end faces 11N and 11S which magnetic field is generally parallel to axis 11A. Magnetic liquid 12 is a closed loop of magnetic fluid along the exposed surface 11B maintained thereat by the magnetic field thereat.

Figure 2:
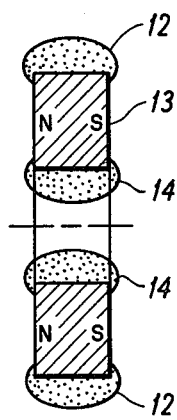
FIG. 2 shows sectional view of a permanent magnet washer with magnetic liquid trapped on its outer and its inner diameters according to the invention.

FIG. 2 illustrates a sectional view of round washer 13 made of permanent magnet material magnetized along its axial direction. Magnetic liquid 12 is shown clinging to the outer circumferential edge of washer 13. In addition, magnetic liquid 14 is shown clinging to the inner circumferential surface of washer 13.

Magnetic liquid 14 is a second closed loop of magnetic fluid along a second exposed surface 13C of washer 13 maintained thereat by the magnetic field thereat.

Figure 3:
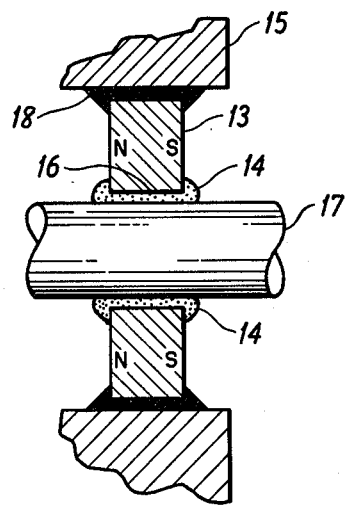
FIG. 3 shows schematically partially in section a simple rotary shaft seal according to the teachings of the invention.

FIG. 3 shows how this type of seal can be used to seal a rotating shaft 17 in a fixed housing 15. Here, annular magnet 13 is firmly attached to housing 15. Shaft 17, which is rotatably affixed to housing 15 protrudes through hole 16 in annular permanent magnet 13. Magnetic liquid 14 is shown trapped between the outer surface of shaft 17 and the inner circumferential surface of magnet 13, thus forming a liquid barrier or a seal. Adhesive sealant 18 permanently seals and affixes annual disc 13 to housing 15.

Figure 4:
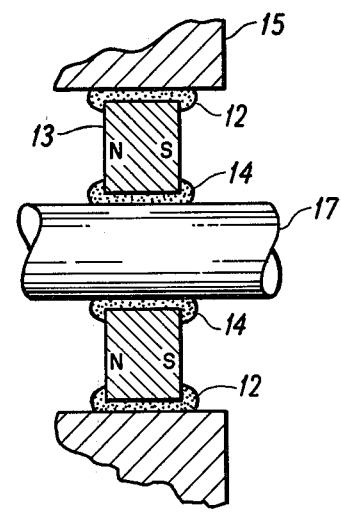
FIG. 4 illustrates a permanent magnet seal partially in section sealing along its outer and inner diameters according to the invention.

FIG. 4 illustrates how annular permanent magnet 13 can seal along its outer and inner circumferential surfaces. Trapped magnetic liquid 12 seals between the outer circumferential surface of annular disc 13 and housing 15, and trapped magnetic liquid 14 seals between the inner circumferential surface of annular disc 13 and shaft 17.

Figure 5:
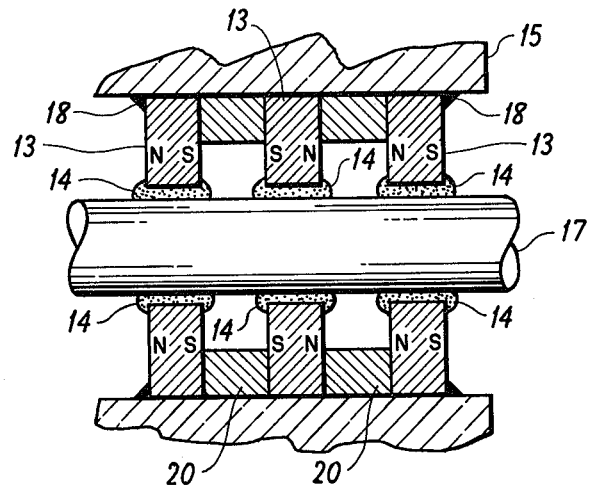
FIG. 5 illustrates how a multiplicity of simple stage sealing washers according to the invention shown partially in section can be used to achieve higher pressure capability.

FIG. 5 illustrates how several permanent magnet annular discs 13 can be used in series to achieve higher sealing pressure.

Figure 6:
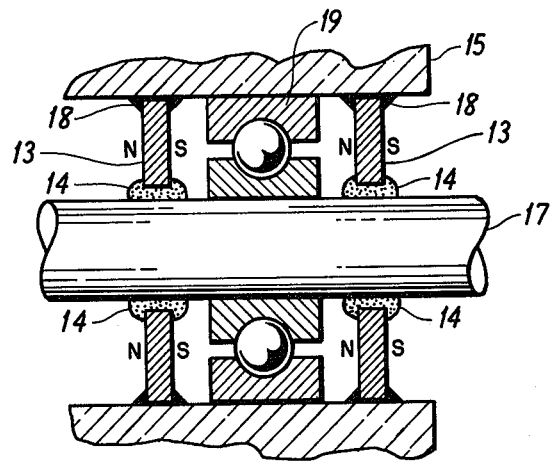
FIG. 6 illustrates how two seals according to the invention shown partially in section can be used to hermetically seal a ball bearing.

FIG. 6 illustrates an embodiment of the invention for sealing a ball bearing. Here, annular permanent magnet discs 13 are located on either side of ball bearing 19. Magnetic liquid 14 clinging to the inner circumferential surfaces of discs 13 forms a hermetic seal around shaft 17. The permanent seal 18 of the outer circumferential surfaces of discs 13 to housing 15 completes an air-tight sealed chamber around the ball bearing. Thus, shaft 17 can rotate without introducing a leak path to bearing 19.

Figure 7:
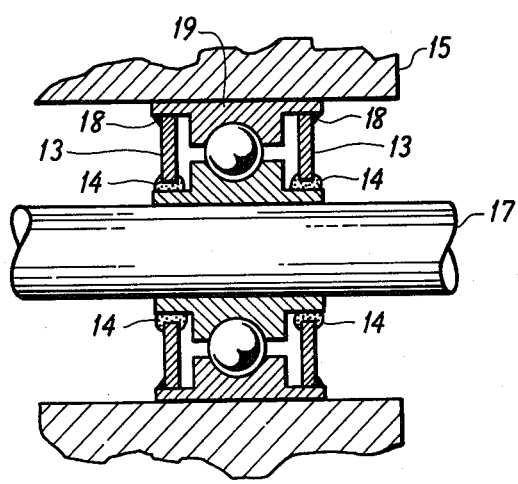
FIG. 7 illustrates another embodiment for sealing a ball bearing shown partially in section according to the invention.

FIG. 7 illustrates still another configuration for sealing a ball bearing. In this configuration the inner and outer races of ball bearing 19 have been elongated to accomodate annular magnets 13. Magnetic liquid 14 is located on the inner circumferential surface of magnet 13 sealing against the inner bearing race. The outer circumferential surface magnet 13 can be bonded to the outer race of bearing 19 as shown at 18. The reverse may also be used in case the magnet 13 must be fixed to the inner race and seals against the outside race.

There has been described novel apparatus and techniques for economically, compactly and reliably effecting a shaft seal. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Magnetic liquid shaft sealing apparatus for sealing between a shaft and a housing comprising,
   thin permanent magnet means characterized by a cross section having a thickness dimension between opposed end faces of the magnet means that is smaller than a height dimension and magnetized along an axis parallel to said thickness dimension for establishing a magnetic field along at least one exposed surface thereof between said end faces which magnetic field is generally parallel to said axis,
   and a closed loop of magnetic fluid along said at least one exposed surface maintained thereat by said magnetic field thereat,
   said magnetic liquid sealing apparatus forming a sealed assembly which consists of in combination a housing member and a shaft member in relative rotational relationship wherein said thin permanent magnet means is a single thin permanent magnetic disc formed with an opening enclosed by a peripheral exposed surface closely adjacent to and surrounding said shaft member and being axially magnetized,
   said magnetic disc being mounted on said housing with said peripheral surface being in closely spaced, rotatable relationship with said shaft member,
   said closed loop of magnetic fluid being a quantity of magnetic liquid occupying and limited to the space between said shaft member and said peripheral surface by the field of said magnetic disc,
   whereby said shaft member is arranged for rotating in contact with said closed loop of magnetic liquid whereby relative rotation with said permanent magnetic disc may occur while said closed loop of magnetic liquid seals the gap therebetween.

2. Magnetic liquid sealing apparatus in accordance with claim 1 and further comprising a plurality of said sealed assemblies each consisting of said housing member and said shaft member with a respective single permanent magnetic disc with a corresponding plurality of the magnetic liquid closed loops axially spaced along said shaft member for sealing a corresponding plurality of gaps between said shaft member and a closely spaced peripheral surface of each of said permanent magnetic discs with each magnetic fluid closed loop occupying and limited to the space between said shaft member and said peripheral surfaces by the field of a respective magnetic disc.

3. Magnetic liquid sealing apparatus in accordance with claim 2 and further comprising ball bearing means between adjacent ones of said axially spaced permanent magnet means within a sealed annular cavity.

4. Magnetic liquid sealing apparatus in accordance with claim 1 wherein the said thickness is within the range of 0.003 to 0.1 inches.

5. Magnetic liquid sealing apparatus in accordance with claim 1 wherein said permanent magnetic disc comprises nylon filled with ferrite.

6. Magnetic liquid shaft sealing apparatus for sealing between a shaft and a housing comprising,
   thin permanent magnet means characterized by a cross section having a thickness dimension between opposed end faces of the magnet means that is smaller than a height dimension and magnetized along an axis parallel to said thickness dimension for establishing a magnetic field along at least one exposed surface thereof between said end faces which magnetic field is generally parallel to said axis,
   and a closed loop of magnetic field along said at least one exposed surface maintained thereat by said magnetic field thereat,
   said magnetic liquid sealing apparatus forming a sealed assembly which consists of in combination a housing member and a shaft member in relative rotational relationship wherein said thin permanent magnet means is a single thin permanent magnetic disc formed with an opening enclosed by a peripheral exposed surface closely adjacent to and surrounding said shaft member and being axially magnetized,
   said magnetic disc being carried in said housing in spaced rotatable relationship therewith, said closed loop of magnetic fluid being a quantity of magnetic liquid occupying and limited to the space between said shaft member and said peripheral surface by the field of said magnetic disc, whereby said shaft member is arranged for rotating in contact with said closed loop of magnetic liquid whereby relative rotation which said permanent magnetic disc may occur while said closed loop of magnetic liquid seals the gap therebetween wherein said permanent magnetic disc includes a second peripheral surface that is in closely spaced, rotatable relationship with said housing member and further comprising a second closed loop of magnetic liquid occupying and limited to the space between said housing member and said second peripheral surface by the field of said magnetic disc whereby relative rotation may occur between said housing member and said permanent magnetic disc and between said shaft member and said permanent magnetic disc while said magnetic liquid seals the gaps therebetween.

7. Magnetic sealing apparatus in accordance with claim 1 wherein said shaft member comprises an inner bearing race and said housing member comprises an outer bearing race.

8. A sealed assembly which consists of in combination a shaft and a housing member in relative movable relationship, a single thin permanent magnetic disc having at least one peripheral surface and being axially magnetized and characterized by a cross section having a thickness dimension between opposed end faces of the magnetic disc that is smaller than a height dimension and magnetized along an axis parallel to said thickness dimension for establishing a magnetic field along said at least one peripheral surface thereof between said end faces which magnetic field is generally parallel to said axis, said magnetic disc being mounted on one of said members with said at least one peripheral surface being in closely spaced, movable relationship with the other member, and a quantity of magnetic liquid occupying and limited to the space between said other member and said at least one peripheral surface by the field of said magnetic disc forming a closed loop of magnetic liquid along said at least one peripheral surface.

9. A sealed assembly in accordance with claim 8 wherein said shaft member comprises an inner bearing race and said housing member comprises an outer bearing race.

10. A sealed assembly which consists of in combination a shaft and a housing member in relative movable relationship, a single thin permanent magnetic disc having at least one peripheral surface and being axially magnetized and characterized by a cross section having a thickness dimension between opposed end faces of the magnetic disc that is smaller than a height dimension and magnetized along an axis parallel to said thickness dimension for establishing a magnetic field along said at least one peripheal surface thereof between said end faces which magnetic field is generally parallel to said axis, said magnetic disc being carried in one of said members in spaced rotatable relationship therewith, and a quantity of magnetic liquid occupying and limited to the space between said other member and said at least one peripheral surface by the field of said magnetic disc forming a closed loop of magnetic liquid along said at least one peripheral surface, and further consisting of a second closed loop of magnetic liquid along a second peripheral surface of said magnetic disc maintained thereat by said magnetic field thereat with said second peripheral surface being in closely spaced, rotatable relationship with said other member, said second closed loop of magnetic liquid occupying and limited to the space between said one member and said second peripheral surface by th field of said magnetic disc.

* * * * *

UNITED STATES PATENT AND TRADEMARK OFFICE
CERTIFICATE OF CORRECTION

PATENT NO. : 4,293,137

DATED : October 6, 1981

INVENTOR(S) : Frederick D. Ezekiel

It is certified that error appears in the above—identified patent and that said Letters Patent is hereby corrected as shown below:

Figure 1 and 2, should appear as shown on the attached sheet.

UNITED STATES PATENT AND TRADEMARK OFFICE
CERTIFICATE OF CORRECTION

PATENT NO. : 4,293,137

DATED : October 6, 1981

INVENTOR(S) : Frederick D. Ezekiel

Page 2 of 2

It is certified that error appears in the above—identified patent and that said Letters Patent is hereby corrected as shown below:

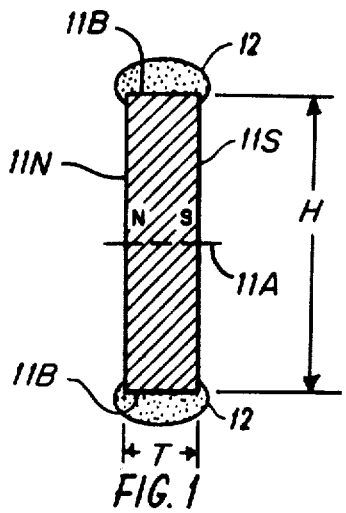

FIG. 1

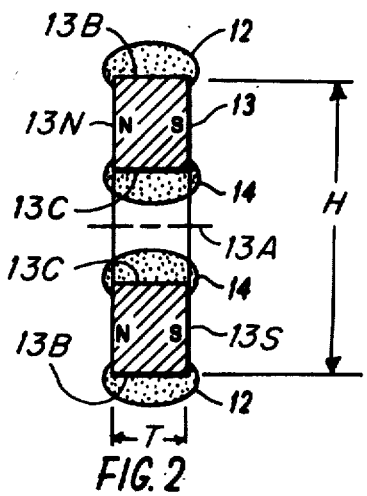

FIG. 2

Signed and Sealed this

Thirtieth Day of March 1982

[SEAL]

Attest:

Attesting Officer

GERALD J. MOSSINGHOFF

Commissioner of Patents and Trademarks